Figure 1:
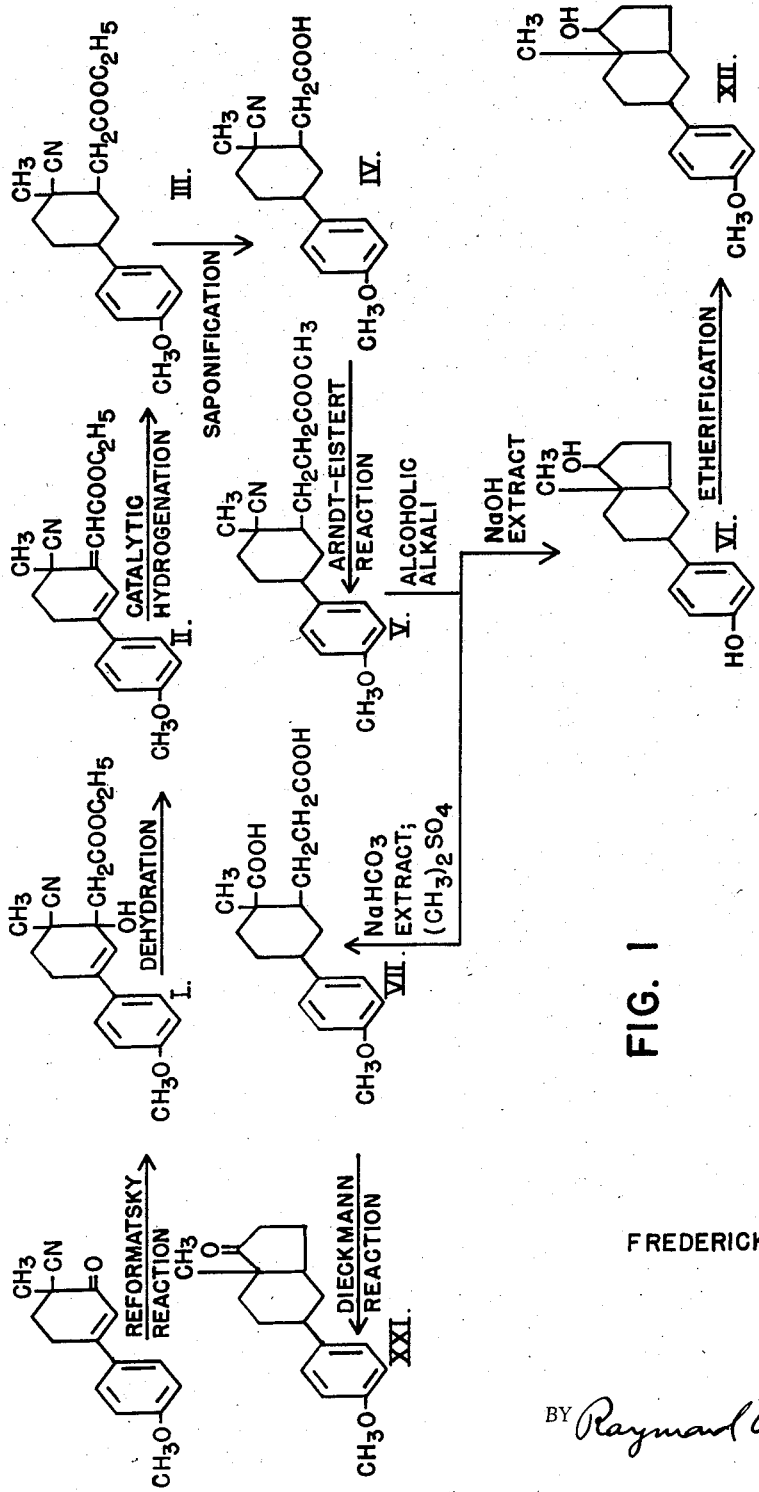

May 12, 1959  F. C. NOVELLO  2,886,589
8-METHYL-5-OXYPHENYL HEXAHYDROINDAN COMPOUNDS
Filed Aug. 5, 1957  2 Sheets-Sheet 1

FREDERICK C. NOVELLO
INVENTOR

BY Raymond Underwood
ATTORNEY

May 12, 1959  F. C. NOVELLO  2,886,589
8-METHYL-5-OXYPHENYL HEXAHYDROINDAN COMPOUNDS
Filed Aug. 5, 1957  2 Sheets-Sheet 2

FREDERICK C. NOVELLO
INVENTOR

BY Raymond Underwood
ATTORNEY

United States Patent Office 2,886,589
Patented May 12, 1959

2,886,589

8-METHYL-5-OXYPHENYL HEXAHYDROINDAN COMPOUNDS

Frederick C. Novello, Lansdale, Pa., assignor to Merck & Co., Inc., Rahway, N.J., a corporation of New Jersey Application August 5, 1957, Serial No. 677,417

6 Claims. (Cl. 260—476)

This invention is concerned generally with hexahydroindan compounds and with a process for preparing them. More particularly it is concerned with hexahydroindan compounds having the general formula

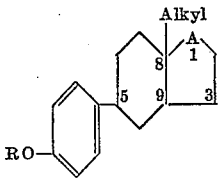

wherein R is hydrogen or a lower alkyl radical, for example, a methyl, ethyl, propyl, butyl, amyl or the like lower alkyl radical or an acyl radical such as a low molecular weight carboxylic acid derived acyl radical such as an acetyl, propionyl, butyryl, benzoyl, phenylacetyl or the like acyl radical; and A is a carbinol radical such as an unsubstituted carbinol

or a lower-alkyl-substituted carbinol radical, e.g.

the carbonyl radical

or an acylmethylene radical

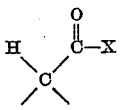

wherein X is a lower alkyl radical, preferably the methyl, ethyl or propyl radical. The alkyl radical attached to the 8-position carbon atom of the hexahydroindan nucleus advantageously is a lower alkyl radical.

The new compounds of this invention are useful as pharmacotherapeutic agents, particularly because of their hormonal activity. Compounds of the above general formula wherein the angular alkyl group is the methyl radical have particularly desirable hormonal activity. Most significant hormonal activity is exhibited by 8-methyl-5-(p-hydroxyphenyl)-hexahydroindanol-1, and 8-methyl-5-(p-hydroxyphenyl)-hexahydroindanone-1, each of which possess estrogenic activity.

The estrogenic activity of these compounds was evaluated according to the assay based on Vaginal Cornification of Ovariectomized Primed Rats described by C. W. Emmens in "Hormone Assay," Academic Press, New York, 1950, Chapter 16, particularly at pages 396–399. The compounds were suspended in corn oil and administered subcutaneously in two injections at approximately 6-hour intervals. The results of these tests, given in Table A, show that each of the compounds specifically mentioned above has a demonstrable order of estrogenic activity.

TABLE A

| Compound | Dosage, μg. | Estrogenic Activity |
|---|---|---|
| 8-Methyl-5-(p-hydroxyphenyl)-hexahydroindanol-1. | 300 | Positive. |
| 8-Methyl-5-(p-hydroxyphenyl)-hexahydroindanone-1. | 500 | Positive. |

Because the compounds of this invention produce an estrogenic response at extremely low dosage levels (1 microgamma [μg.] is equal to 1/1000 milligram) toxicity does not become an important consideration when employing the compounds in pharmacotherapy. The compounds advantageously can be admixed with a vegetable oil such as corn oil, sesame oil and the like at a concentration of, for example, 100, 150, 200, 250 mg. per 0.1 cc. for subcutaneous administration by the physician.

In accordance with this invention, the hexahydroindanes having the above general structure are prepared according to the series of reactions illustrated on the attached drawings, Figures I and II. These reaction formulae show that by starting with 3-(p-alkoxy-phenyl)-6-cyano-6-alkyl-2-cyclohexene-1-one [prepared by reacting a β-tertiary aminoketone hydrochloride (derived by the Mannich reaction on an aryl alkyl ketone) and a methylene carbon atom capable of undergoing the Michael condensation in the presence of a catalyst, for example, the methylene carbon atom of an acetone derivative, to yield a 3-aryl-cyclohexene-2-one-1] and treating it according to the Reformatsky reaction with an alkyl ester of a haloacetic acid in the presence of a catalyst, advantageously zinc, the 1-keto group is converted to the 1-hydroxy-1-carbalkoxymethyl radical illustrated in Figure I as Compound I. The haloacetate reactant employed in this step is advantageously a lower-alkyl ester of haloacetic acid, e.g. the ethyl ester of bromoacetic acid which is commercially available and quite suitable in this reaction although the methyl or propyl ester would be equally effective. Compound I then is dehydrated by known methods to yield the exocyclic diene (II), which upon catalytic hydrogenation in the presence of palladium and glacial acetic acid, is converted to the saturated cyclohexane derivative, Compound III. Saponification of Compound III yields the free acid, Compound IV, which in turn is converted to the propionate derivative, Compound V, by the Arndt-Eistert reaction. Two compounds are formed when Compound V is treated with alcoholic alkali, one of which, a dicarboxyl derivative VII, is separated from an ether extraction of the reaction mixture by a dilute sodium bicarbonate solution and the other, a cyclicized derivative VI, which is separated from the ether extract by use of aqueous sodium hydroxide. To obtain the reaction product from the sodium bicarbonate extract, dimethyl sulfate is added and the product thus formed is saponified yielding Compound VII. Compound VII then can be cyclicized either (1) by forming its diester and then subjecting it to the Dieckmann reaction, or (2) by distillation of the free acid in the presence of lead carbonate. Each of these methods yields the cyclized Compound XXI. The second product separated from the ether extract by aqueous sodium hydroxide can be precipitated from the alkali solution by acid, advantageously dilute hydrochloric acid, yielding directly Compound VI.

In order to work with the 1-hydroxy group of the hexahydroindan nucleus of Compound VI, the hydroxy group attached to the phenyl nucleus needs to be protected. This is accomplished either by etherification (for example by converting it to an alkoxy group by treatment with a dialkyl sulfate or other well known etherifying agents according to known methods, obtaining compounds illustrated by Compound XII, Figure I), or by acylation which is the method preferentially employed by applicant because of the ease by which the acyl group can be removed to produce the hydroxy derivative after the desired change has been effected at the 1-position of the hexahydroindan nucleus.

Figure 2:
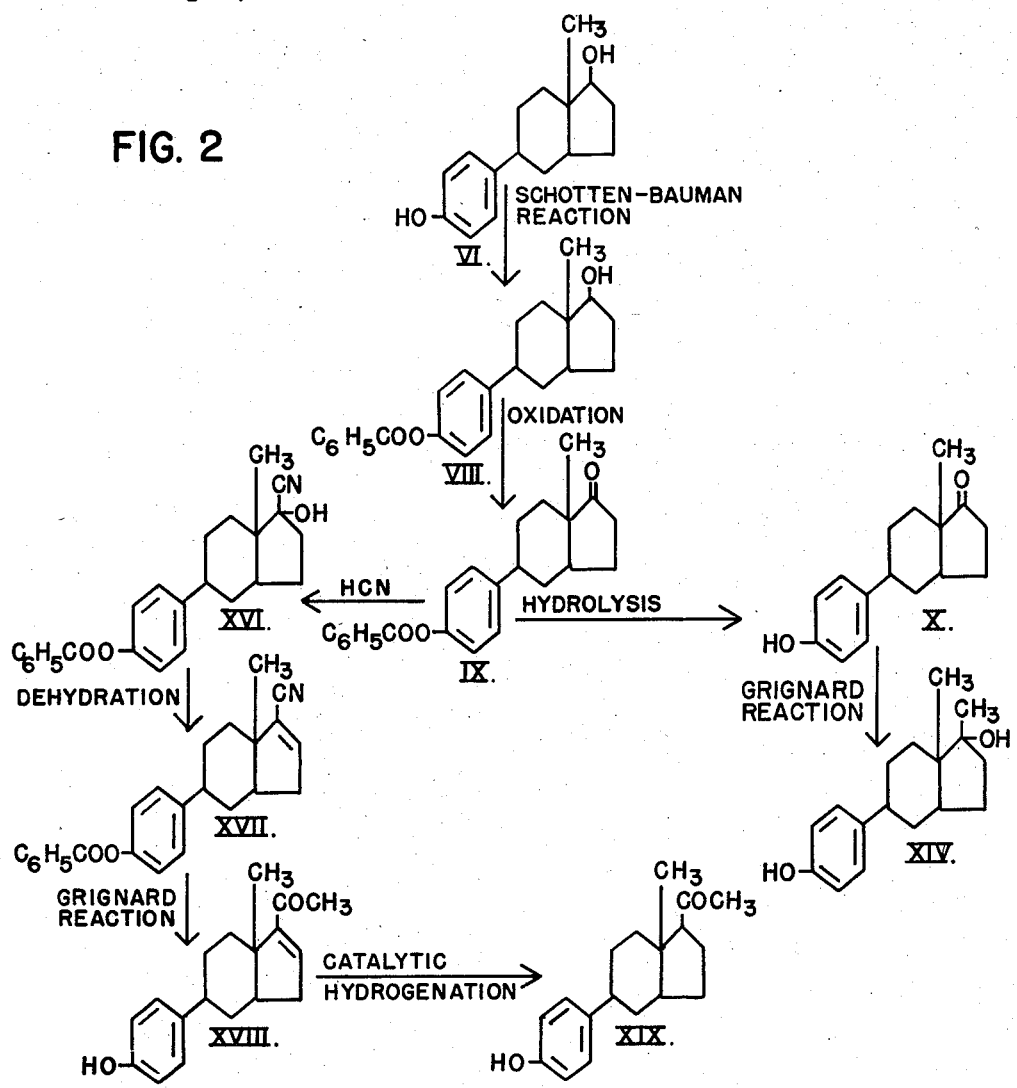

The acylation of Compound VI can be accomplished by any of the known methods. Benzoylation can be effected in the reaction illustrated in Figure 2 by reacting Compound VI with benzoyl chloride according to the Schotten-Bauman reaction. Having protected the phenolic hydroxy group, the 1-hydroxy group of Compound VIII can be oxidized by known methods to the keto group, Compound IX. Hydrolysis of Compound IX produces Compound X. By treating Compound X according to the Grignard reaction, advantageously with an excess of an alkyl magnesium halide, preferably with an excess of methyl magnesium iodide, Compound XIV is formed.

Compound VI can be used to prepare another series of new compounds by following the above procedure up to the preparation of Compound IX and then converting Compound IX to the corresponding cyanhydrin derivative, Compound XVI, by known methods. The cyanhydrin derivative then is dehydrated by known methods, advantageously employing phosphorus oxychloride in pyridine, to the unsaturated nitrile, Compound XVII. The nitrile group of Compound XVII, when treated according to the Grignard reaction, advantageously with an excess of the selected alkyl magnesium halide, e.g. methyl magnesium halide, is converted to an acyl group illustrated by Compound XVIII. Upon catalytic hydrogenation, the hexahydroindene moiety of Compound XVIII is saturated thus forming Compound XIX.

The above series of reactions will be illustrated in more detail by the following complete examples. It is to be understood that modifications within the knowledge of those skilled in this art can be made in the described procedural steps without departing from the spirit and scope of this invention.

*Example 1*

6-METHYL-5-(p-HYDROXYPHENYL)-HEXAHYDRO-INDANOL-1 (VI)

*Step a: Ethyl 1-hydroxy-3-(p-methoxyphenyl)-6-cyano-6-methyl-2-cyclohexenylacetate (I)*.—A solution of 9.6 g. (0.04 mol) of 3-(p-methoxyphenyl)-6-cyano-6-methyl-2-cyclohexen-1-one in 125 ml. of dry benzene is treated with 6.0 g. of granulated zinc, 6 ml. of ethyl bromoacetate and a crystal of iodine and refluxed with stirring for 1 hour. A second addition of 6 g. of zinc and 6 ml. of ethyl bromoacetate is made and heating and stirring continued. Three more additions of 6 g. of zinc are made at 45 minute intervals. Mixture then is refluxed and stirred for an additional hour for a total reaction time of 4¾ hours. The reaction mixture is cooled and the complex dissolved by addition of cold, dilute acetic acid (1:1). The solution is extracted with ether (150 ml.) and the organic layer washed with two 50 ml. portions of water, three 50 ml. portions of dilute ammonium hydroxide, two 50 ml. portions of water and dried over sodium sulfate. The solution is filtered, evaporated to dryness and the product, ethyl 1-hydroxy-3-(p-methoxyphenyl) - 6 - cyano-6-methyl-2-cyclohexenyl-acetate (I), crystallized from a mixture of ether and petroleum ether as pale yellow flakes, melting point 91.5–92.5° C.;

Analysis calculated for $C_{19}H_{23}NO_4$: C, 69.28; H, 7.03; N, 4.25. Found: C, 69.26; H, 6.94; N, 4.22.

*Step b: Ethyl 3-(p-methoxyphenyl)-6-cyano-6-methyl-2-cyclohexenyldieneacetate (II)*.—A solution of 10 g. of ethyl 1-hydroxy-3-(p-methoxyphenyl)-6-cyano-6-methyl-2-cyclohexenylacetate (I) and 20 g. of anhydrous oxalic acid in 100 ml. of glacial acetic acid is refluxed for 1 hour and concentrated to dryness in vacuo. The residue is treated with water and extracted with ether (200 ml.). The ethereal solution is washed with two 50 ml. portions of water, two 50 ml. portions of 5% sodium bicarbonate solution and dried over sodium sulfate. The ethereal solution is filtered, evaporated to dryness and the residue distilled in high vacuo. The product is crystallized from a mixture of alcohol and water as yellow needles, melting point 71.8–73.8° C.;

Analysis calculated for $C_{19}H_{21}NO_3$: C, 73.29; H, 6.80; N, 4.50. Found: C, 73.38; H, 6.87; N, 4.44.

*Step c: 3-(p-methoxyphenyl) - 6 - cyano-6-methylcyclohexylacetic acid (IV)*.—A solution of 12.0 g. of ethyl 3-(p-methoxyphenyl) - 6 - cyano-6-methyl-2-cyclohexenyldieneacetate (II) in 100 ml. of glacial acetic acid is shaken in an atmosphere of hydrogen in the presence of 500 mg. of palladium on charcoal catalyst until hydrogen absorption ceased. The solution is filtered and concentrated to dryness in vacuo. The product, ethyl 3-(p-methoxyphenyl)-6-cyano-6-methylcyclohexylacetate (III) obtained as an oil upon distillation at 0.5 mm. pressure;

Analysis calculated for $C_{19}H_{25}NO_3$: C, 72.35; H, 7.99; N, 4.44. Found: C, 72.43; H, 8.02; N, 4.32.

The product (III) thus obtained is dissolved in 75 ml. of ethanol and refluxed for 1½ hours with 75 ml. of 5% sodium hydroxide. The greater portion of alcohol is removed by distillation and the residual solution diluted with water and washed once with 50 ml. of ether. The alkaline solution is acidified in the cold with dilute hydrochloric acid and the precipitate extracted with 300 ml. of ether. The ethereal solution is washed with two 50 ml. portions of water dried over sodium sulfate, filtered and evaporated to dryness. Crystallization of the residue from a mixture of acetone and petroleum ether gave one isomer of 3-(p-methoxyphenyl)-6-cyano-6-methylcyclohexylacetic acid (IV), melting point 208.3–209.3° C.;

Analysis calculated for $C_{17}H_{21}NO_3$: C, 71.05; H, 7.37. Found: C, 71.28; H, 7.24.

The mother liquor from the above crystallization is concentrated in vacuo and crystallization of the residue from benzene-hexane afforded a second isomer, M.P. 128–129° C.

Analysis calculated for $C_{17}H_{21}NO_3$: C, 71.05; H, 7.37. Found: C, 71.22; H, 7.45.

*Step d: Methyl β-[3-(p-methoxyphenyl)-6-cyano-6-methylcyclohexyl] propionate (V)*.—A solution of 2 g. of the lower melting isomer of 3-(p-methoxyphenyl)-6-cyano-6-methylcyclohexylacetic acid (IV) in 7 ml. of dry benzene is treated with 2.5 ml. of oxalyl chloride. After 1 hour at room temperature and 10 minutes at 40° C., the solution is concentrated to dryness in vacuo; 5 ml. of benzene is added and the solution again concentrated to dryness. The residual oil is taken up in 25 ml. of dry benzene and added dropwise to a cold ethereal solution of diazomethane, prepared from 7.5 g. of nitrosomethylurea. After standing at room temperature for 3 hours, the solution is concentrated to dryness in vacuo. The residue is dissolved in 75 ml. of anhydrous methanol and treated with 200 mg. of silver oxide. The mixture is warmed to 50° C. and after 30 minutes a suspension of 200 mg. of silver oxide in 10 ml. of anhydrous methanol is added in portions over a 1 hour period; the temperature being maintained at 50° C. After refluxing for 1 hour, the solution is filtered and concentrated to dryness in vacuo. The residue is taken up in 150 ml. of ether and washed with two 25 ml. portions of 5% aqueous sodium hydroxide, two 25 ml. portions of water dried over sodium sulfate, filtered and concentrated to dryness. The residue is distilled in vacuo to give methyl β-[3-(p-methoxyphenyl) - 6-cyano-6-methylcyclohexyl]-propionate (V), a pale yellow viscous oil;

Analysis calculated for $C_{19}H_{25}NO_3$: C, 72.35; H, 7.99. Found: C, 72.13; H, 7.96.

*Step e: 8-methyl-5-(p-hydroxyphenyl)-hexahydroindanol-1 (VI).*—A mixture of 1.75 g. of methyl β-[3-(p-methoxyphenyl) - 6 - cyano-6-methylcyclohexyl]propionate (V), 20 g. of potassium hydroxide and 35 ml. of absolute methanol is heated in a steel autoclave with shaking at 225° C. for 72 hours. When cool, the bomb is emptied into a beaker and the solution evaporated to dryness. The residue is dissolved in water (100 ml.), cooled in an ice bath and acidified with dilute hydrochloric acid. The precipitate is extracted with ether (200 ml.) and the ethereal solution washed with water and extracted with two 50 ml. portions of 5% aqueous sodium bicarbonate (which are combined and set aside for use in preparing Compound VII, described below in Example 4, Step a) and then with two 50 ml. portions of 10% aqueous sodium hydroxide. The sodium hydroxide extracts are combined and then acidified with dilute hydrochloric acid. The precipitate formed is separated by filtration and redissolved in 150 ml. of ether. The ethereal solution is washed with two 50 ml. portions of water, dried over sodium sulfate, filtered and evaporated to dryness. Crystallization of the residue from a mixture of acetone and petroleum ether yields 8-methyl-5-(p-hydroxyphenyl)-hexahydroindanol-1 (VI) in the form of colorless needles, melting point 200–202° C.;

Analysis calculated for $C_{16}H_{22}O_2$: C, 78.01; H, 9.00. Found: C, 78.04; H, 9.11.

Example 2

8-ETHYL-5-(p-HYDROXYPHENYL)-HEXAHYDRO-INDANOL-1

This product is prepared by the procedural steps described in Example 1 by replacing the 3-(p-methoxyphenyl)-6-cyano-6-methyl-2-cyclohexen-1-one reactant employed in Step *a* by an equimolecular quantity of 3-(p-methoxyphenyl)-6-cyano-6-ethyl-2-cyclohexen-1-one, and following substantially the same procedure described in Step *a*, yielding ethyl 1-hydroxy-3-(p-methoxy-phenyl)-6-cyano-6-ethyl-2-cyclohexenylacetate. This product is then converted by the methods described in Example 1, Step *b* through *e* to 8-ethyl-5-(p-hydroxyphenyl)-hexahydroindonal-1.

Example 3

8-PROPYL-5-(p-HYDROXYPHENYL)-HEXAHYDRO-INDANOL-1

This product is prepared by the procedural steps described in Example 1 by replacing the 3-(p-methoxyphenyl) - 6-cyano-6-methyl-2-cyclohexen-1-one reactant employed in Step *a* by an equimolecular quantity of 3-(p-propoxyphenyl)-6-cyano-6-propyl-2-cyclohexen - 1 - -one and following substantially the same procedure described therein. The ethyl 1-hydroxy-3-(p-propoxyphenyl)-6-cyano-6-propyl-2-cyclohexenyl acetate thus obtained is then converted by the methods described in Example 1, Steps *b* through *e* to 8-propyl-5-(p-hydroxphenyl)-hexahydroindanol-1.

Example 4

8-METHYL-5-(p-METHOXYPHENYL)-HEXAHYDRO-INDANONE-1 (XXI)

*Step a: β-[3-(p-methoxyphenyl)-6-carboxy-6- methylcyclohexyl] propionic acid (VII).*—The bicarbonate extract obtained in Example 1, Step *e*, is acidified with dilute hydrochloric acid to Congo red in the cold and the precipitate is taken up in 150 ml. of ether. The ethereal solution is washed with two 50 ml. portions of water, dried over sodium sulfate, filtered and evaporated to dryness. The residue is dissolved in 10 ml. of 5% aqueous sodium hydroxide, cooled in an ice bath and treated with 1 g. of dimethyl sulfate. After shaking at room temperature for 30 minutes, 10 ml. of 20% aqueous sodium hydroxide is added and the solution refluxed for 1 hour. After cooling in an ice bath, the solution is washed with 50 ml. of ether, acidified with dilute hydrochloric acid and the precipitate taken up in 150 ml. of ether. The ethereal solution is washed with two 50 ml. portions of water, dried over sodium sulfate, filtered and evaporated to dryness. Crystallization of the residue from a mixture of ether and petroleum ether yields β-[3-(p-methoxyphenyl)-6-carboxy-6-methylcyclohexyl] propionic acid (VII) in the form of colorless needles, melting point 180.2–181.5° C.;

Analysis calculated for $C_{18}H_{24}O_5$: C, 67.48; H, 7.55. Found: C, 67.69; H, 7.63.

*Step b: 8-methyl-5-(p-methoxyphenyl)-hexahydroindanone-1 (XXI).*—An intimate mixture of 265 mg. of the thus obtained β - [3 - (p-methoxyphenyl)-6-carboxy-6-methylcyclohexyl] propionic acid (VII) and 265 mg. of lead carbonate is heated in a test tube at 270° C. for 30 minutes and then distilled in high vacuum. The product, 8-methyl-5-(p-methoxyphenyl)-hexahydroindanone-1, (XXI), is crystallized from a mixture of ether and petroleum ether as colorless needles, melting point 124–125.5° C.;

Analysis calculated for $C_{17}H_{22}O_2$: C, 79.03; H, 8.59. Found: C, 78.78; H, 8.29.

Example 5

8-METHYL-5-(p-BENZOXYPHENYL)-HEXAHYDRO-INDANOL-1 (VIII)

A cold solution of 275 mg. of 8-methyl-5-(p-hydroxyphenyl)-hexahydroindanol-1 (VI) in 25 ml. of 5% aqueous sodium hydroxide is shaken at 0° C. with 1 g. of benzoyl chloride for 5 minutes. The solid precipitate is extracted with 100 ml. of ether and the ethereal solution washed with two 25 ml. portions of water, dried over sodium sulfate, filtered and concentrated. The product, 8-methyl-5-(p-benzoxyphenyl)-hexahydroindanol-1 (VIII), crystallizes from a mixture of ether and petroleum ether as colorless plates, melting point 125.5–127° C.;

Analysis calculated for $C_{23}H_{26}O_3$: C, 78.82; H, 7.48. Found: C, 78.94; H, 7.53.

Example 6

8-METHYL-5-(p-BENZOXYPHENYL)-HEXAHYDRO-INDANONE-1 (IX)

A solution of 185 mg. of 8-methyl-5-(p-benzoxyphenyl)-hexahydroindanol-1 (VIII) in 20 ml. of glacial acetic acid is cooled to 20° C. and treated dropwise with a solution of 85 mg. of chromium trioxide in 5 drops of water and 10 ml. of glacial acetic acid. After standing at room temperature for 24 hours, 5 ml. of methanol is added and the solution concentrated to dryness in vacuo. The residue is treated with 25 ml. of water and extracted with 100 ml. of ether. The etheral solution is washed with two 25 ml. portions of water, two 25 ml. portions of 5% sodium bicarbonate and dried over sodium sulfate. The solution is filtered, evaporated to dryness and the residue crystallized from a mixture of acetone and petroleum ether yielding 8-methyl-5-(p-benzoxyphenyl)-hexahydroindanone-1 (IX) as colorless needles, melting point 129.5–131.5° C;

Analysis calculated for $C_{23}H_{24}O_3$: C, 79.28; H, 6.94. Found: C, 79.09; H, 6.86.

Example 7

8-METHYL-5-(p-HYDROXYPHENYL)-HEXAHYDRO-INDANONE-1 (X)

A solution of 200 mg. of 8-methyl-5-(p-benzoxyphenyl)-hexahydroindanone-1 (IX) in 10 ml. of methanol is refluxed for 1 hour with 15 ml. of 5% aqueous sodium hydroxide, cooled and diluted with 10 ml. of water and acidified with dilute hydrochloric acid. The product is extracted with 100 ml. of ether and the ethereal solution then is washed with two 25 ml. portions of water, two 25 ml. portions of 5% sodium bicarbonate and dried over sodium sulfate. The solution is filtered, concentrated, and the product, 8-methyl-5-(p-hydroxyphenyl)-hexahydroindanone-1 (X), crystallized from a mixture of ether and petroleum ether as colorless plates, melting point 125.5–127° C;

Analysis calculated for $C_{16}H_{20}O_2$: C, 78.65; H, 8.25. Found: C, 78.66; H, 8.21.

Example 8

8-ETHYL-5-(p-HYDROXYPHENYL)-HEXAHYDROINDANONE-1

This compound is prepared by replacing the 8-methyl-5-(p - hydroxyphenyl) - hexahydroindanol-1 reactant employed in Example 5 by an equimolecular quantity of 8-ethyl-5 - (p-hydroxyphenyl) - hexahydroindanol-1 (prepared as described in Example 2) and reacting it with 1 g. of phenylacetyl chloride in substantially the same way as that outlined in Example 5. The thus obtained 8-ethyl-5 - (p-phenylacetoxyphenyl) - hexahydroindanol-1 then is oxidized to 8-ethyl-5-(p-phenacetoxyphenyl)-hexahydroindanone-1 by the process described in Example 6 and then hydrolyzed by the process described in Example 7 to 8-ethyl-5-(p-hydroxyphenyl-hexahydroindanone-1.

Example 9

8-PROPYL-5-(p-HYDROXYPHENYL)-HEXAHYDROINDANONE-1

This compound is prepared by replacing the 8-methyl-5 - (p - hydroxyphenyl) - hexahydroindanol reactant employed in Example 5 by an equimolecular quantity of 8-propyl-5-(p-hydroxyphenyl)-hexahydroindanol-1 (prepared as described in Example 3) and reacting it with 1 g. of butyryl chloride by substantially the same method specified in Example 5. The thus obtained 8-propyl-5-(p-butyryloxyphenyl)-hexahydroindanol-1 then is oxidized by the process described in Example 6 and then hydrolyzed by the process described in Example 7 to 8-propyl-5-(p-hydroxyphenyl)-hexahydroindanone-1.

Example 10

8-METHYL-5-(p-METHOXYPHENYL)-HEXAHYDROINDANOL-1 (XII)

A cold solution of 100 mg. of 8-methyl-5-(p-hydroxyphenyl)-hexahydroindanol-1 (VI) in 5 ml. of 10% aqueous sodium hydroxide is shaken at 0° C. for 20 minutes with 2 ml. of dimethyl sulfate, then diluted with 5 ml. of 10% aqueous solution sodium hydroxide and warmed on a steam bath for 10 minutes. The mixture is cooled and the product extracted with 50 ml. of ether. The ethereal solution is washed with 10 ml. of 10% aqueous sodium hydroxide, two 10 ml. portions of water, and dried over sodium sulfate. The ethereal solution is filtered, concentrated and the product, 8 - methyl - 5 - (p-methoxyphenyl) - hexahydroindanol-1 (XII), crystallized from a mixture of ether and petroleum ether as colorless plates, melting point 102.5–103.5° C.;

Analysis calculated for $C_{17}H_{24}O_2$: C, 78.42; H, 9.29. Found: C, 78.49; H, 9.40.

The above etherification is repeated employing the product of Example 2, 8-ethyl-5-(p-hydroxyphenyl)-hexahydroindanol-1, and of Example 3, 8-propyl-5-(p-hydroxyphenyl)-hexahydroindanol-1, for the 8-methyl-5-(p - hydroxyphenyl) - hexahydroindanol - 1 employed in Example 10 thus obtaining 8-ethyl-5-(p-methoxyphenyl)-hexahydroindanol-1 and 8-propyl-5-(p-methoxyphenyl)-hexahydroindanol-1 respectively.

Example 11

8-METHYL-5-(p-ETHOXYPHENYL)-HEXAHYDROINDANOL-1

The process of Example 10 is repeated with the exception that the dimethyl sulfate is replaced by an equal quantity of diethyl sulfate. A good yield of 8-methyl-5-(p-ethoxyphenyl)-hexahydroindanol-1 thus is obtained.

Example 12

1,8-DIMETHYL-5-(p-HYDROXYPHENYL)-HEXAHYDROINDANOL-1 (XIV)

A solution of 5.0 g. (0.02 mole) of 5-(p-hydroxyphenyl)-8-methylhexahydroindanone-1 (X) in 100 cc. of anhydrous ether is added dropwise over 1 hour to a solution of 0.2 mole of methylmagnesium iodide in 200 cc. of anhydrous ether. After refluxing for 4 hours the mixture is cooled and decomposed with ice and dilute hydrochloric acid. The ethereal solution is separated, washed with two 50 cc. portions of water, two 50 cc. portions of 5% sodium bicarbonate solution and dried over sodium sulfate. The solution is filtered, concentrated and diluted with petroleum ether yielding, upon crystallization from a mixture of ether and petroleum ether, 1,8-dimethyl-5 - (p-hydroxyphenyl) - hexahydroindanol-1 (XIV).

Example 13

1-ACETYL-5-(p-HYDROXYPHENYL)-8-METHYL-HEXAHYDROINDAN (XIX)

Step a: *Cyanhydrin of 5-(p-benzoxyphenyl)-8-methylhexahydroindanone-1 (XVI)*.—A solution of 3.5 g. (0.01 mol) of 5-(p-benzoxyphenyl)-8-methyl-hexahydroindanone- (IX) (product of Example 6) in 30 cc. of glacial acetic acid and 70 cc. of ethanol is stirred at 50° C. for 24 hours with 10 g. of potassium cyanide. Water is added and the solid precipitate collected on the filter. Crystallization from a mixture of ether and petroleum ether yields the cyanhydrin of 5-(p-benzoxyphenyl)-8-methyl-hexahydroindanone-1 (XVI).

Step b: *1-cyano-5-(p-benzoxyphenyl)-8-methyl-hexahydroindene-1 (XVII)*.—A solution of 3.8 g. (0.01 mole) of the cyanhydrin of 5-(p-benzoxyphenyl)-8-methyl-hexahydroindanone-1 (XVI) in 12 cc. of pyridine is treated with 2.0 cc. of phosphorus oxychloride. After standing at room temperature overnight, the solution is diluted with water and the product collected on the filter. Crystallization from a mixture of ether and petroleum ether yields 1-cyano-5-(p-benzoxyphenyl) - 8 - methyl - hexahydroindene-1 (XVII).

Step c: *1-acetyl-5-(p-hydroxyphenyl)-8-methyl-hexahydroindene-1 (XVIII)*.—A solution of 3.6 g. (0.01 mole) of 1 - cyano-5-(p-benzoxyphenyl)-8-methyl - hexahydroindene-1 (XVII) in 50 cc. of benzene is added dropwise over a 5 minute period to 0.05 mole of methylmagnesium iodide in 50 cc. of ether and 100 cc. of benzene. After refluxing for 5 hours, the mixture is cooled and decomposed with ice and diluted hydrochloric acid. The acid layer is separated and heated on the steam bath for two hours, cooled and extracted with ether. The ethereal extract is washed with two 25 cc. portions of water, two 24 cc. portions of 5% sodium bicarbonate solution and dried over sodium sulfate. The ethereal solution is filtered, concentrated and diluted with petroleum ether. Crystallization from a mixture of ether and petroleum ether yields 1-acetyl-5-(p-hydroxyphenyl)-8-methyl-hexahydroindene-1 (XVIII).

Step d: *1-acetyl-5-(p-hydroxyphenyl)-8-methyl-hexahydroindan (XIX)*.—A solution of 540 mg. of 1-acetyl-5-(p-hydroxyphenyl)-8-methyl-hexahydroindene-1 (XVIII) in 50 ml. of alcohol is shaken with hydrogen at atmospheric pressure in the presence of 100 mg. of palladium on charcoal catalyst until one molecular equivalent of hydrogen is absorbed. The solution is filtered and the filtrate concentrated to dryness in vacuo. Recrystallization of the residue from a mixture of ether and petroleum ether yields 1-acetyl-5-(p-hydroxyphenyl)-8-methyl-hexahydroindan (XIX).

It is to be understood that the invention is not to be limited to the exact details of operation or exact compounds shown and described as obvious modifications and equivalents will be apparent to one skilled in this art.

This application is a continuation-in-part of my copending U.S. patent application, Serial No. 375,714, filed August 21, 1953, now abandoned.

What is claimed is:

1. Hexahydroindan compounds having the general formula

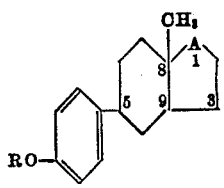

wherein R is selected from the group consisting of hydrogen, lower alkyl and a low molecular weight carboxylic acid derived acyl radical; and A is selected from the group consisting of the carbinol and the carbonyl radicals.

2. 8-methyl-5-(p-hydroxyphenyl)-hexahydroindanol-1.
3. 8-methyl-5-(p-hydroxyphenyl)-hexahydroindanone-1.
4. 8-methyl-5-(p-benzoxyphenyl)-hexahydroindanol-1.
5. 8-methyl-5-(p-benzoxyphenyl)-hexahydroindanone-1.
6. 8-methyl-5-(p-methoxyphenyl)-hexahydroindanone-1.

References Cited in the file of this patent

UNITED STATES PATENTS

| | | |
|---|---|---|
| 2,407,673 | Milas | Sept. 17, 1946 |
| 2,447,099 | Solmssen | Aug. 17, 1948 |
| 2,493,730 | Solmssen | Jan. 3, 1950 |